United States Patent
Tatsukawa et al.

(10) Patent No.: US 6,821,004 B2
(45) Date of Patent: Nov. 23, 2004

(54) HEADLAMP FOR VEHICLE

(75) Inventors: Masashi Tatsukawa, Shizuoka (JP); Toshiyuki Kinouchi, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 27 days.

(21) Appl. No.: 10/308,814

(22) Filed: Dec. 3, 2002

(65) Prior Publication Data

US 2003/0103358 A1 Jun. 5, 2003

(30) Foreign Application Priority Data

Dec. 3, 2001 (JP) .................................... P.2001-369382
Dec. 25, 2001 (JP) .................................... P.2001-391311

(51) Int. Cl.[7] ................................................ B60Q 1/04
(52) U.S. Cl. ........................ 362/465; 362/539; 362/512
(58) Field of Search ............................... 362/507, 512, 362/513, 529, 539, 530, 284, 324, 465, 467, 464, 277

(56) References Cited

U.S. PATENT DOCUMENTS 6,428,195 B1   8/2002   Ohshio et al.

FOREIGN PATENT DOCUMENTS

GB   2345747   7/2000

*Primary Examiner*—Thomas M. Sember
*Assistant Examiner*—Hargobind S. Sawhney
(74) *Attorney, Agent, or Firm*—Fish & Richardson P.C.

(57) ABSTRACT

A lighting unit for a low beam is provided with a movable shade constituted to take a shielding position in which a part of light incident on a reflector from a light source is shielded and a shielding release position in which the shielding is released. When a vehicle speed exceeds a predetermined set vehicle speed, or when a vehicle turns toward the opposite lane side, the movable shade is moved to the shielding release position, thereby adding auxiliary light distribution patterns P(B) and P(C) having cutoff lines CLb and CLc above cutoff lines CL1 and CL2 of a low beam distribution pattern P(L) to the low beam distribution pattern P(L) to carry out beam irradiation. Thus, the visibility of a distant road is enhanced.

7 Claims, 9 Drawing Sheets

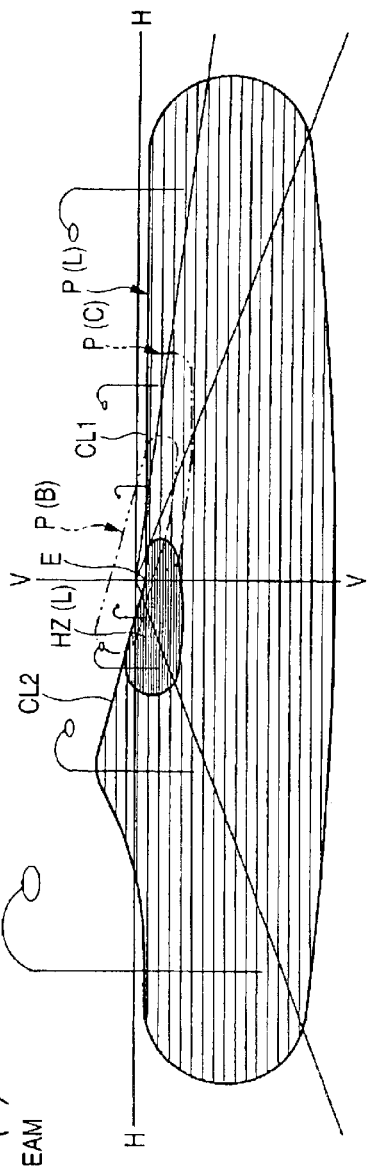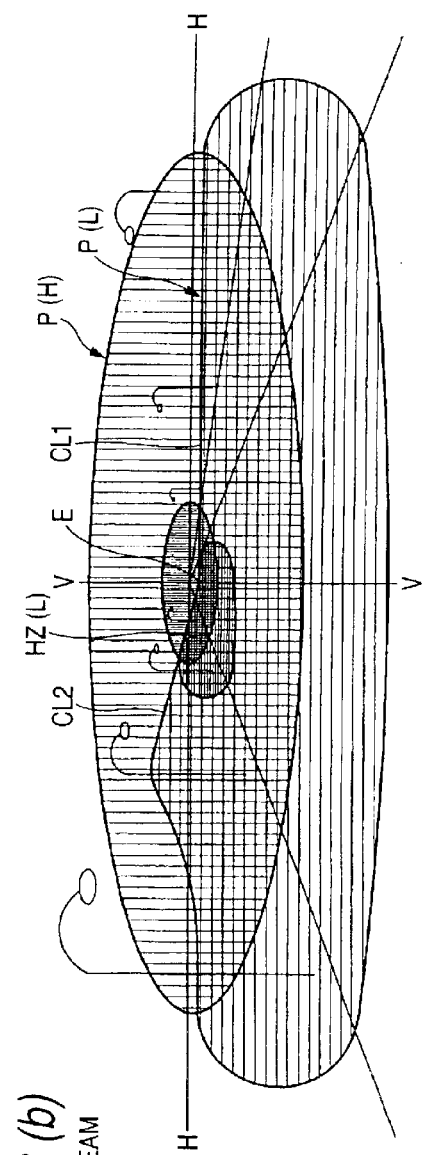
FIG. 6 (a) LOW BEAM
FIG. 6 (b) HIGH BEAM

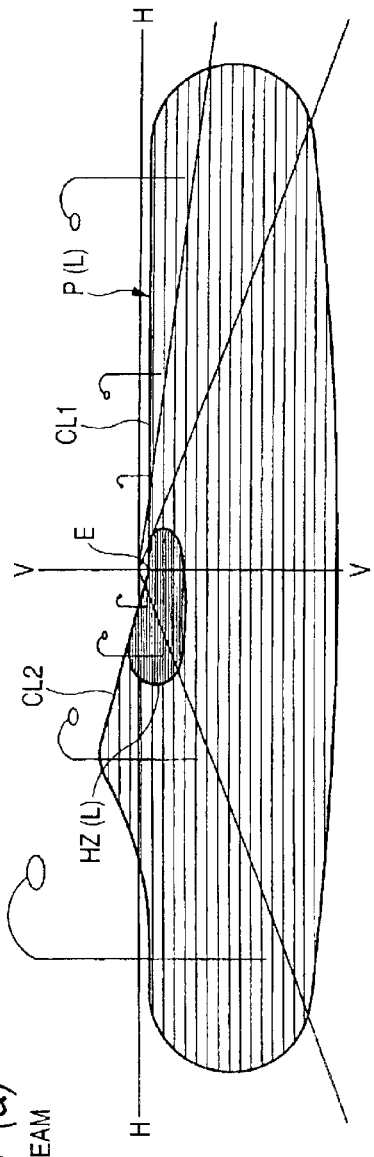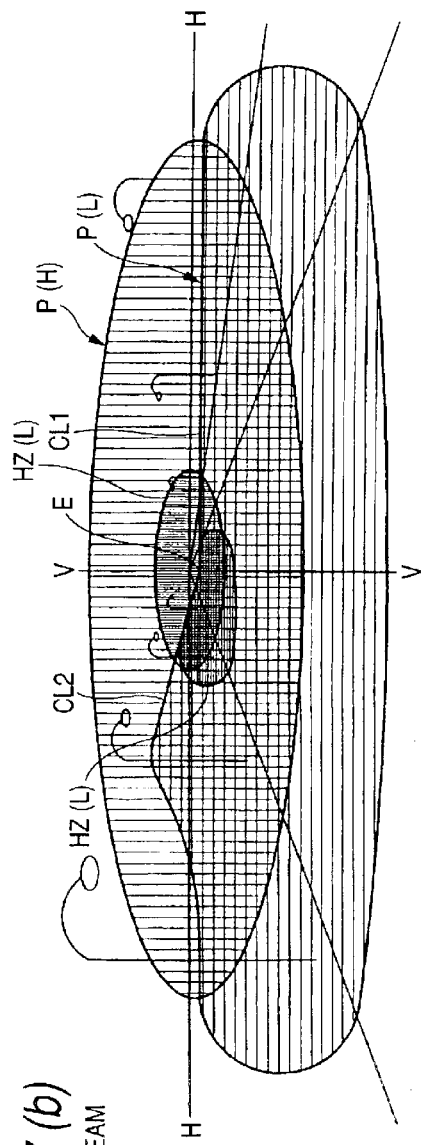
FIG. 7(a) LOW BEAM — LOW-MIDIUM SPEED DRIVE
FIG. 7(b) HIGH BEAM HIGH SPEED DRIVE
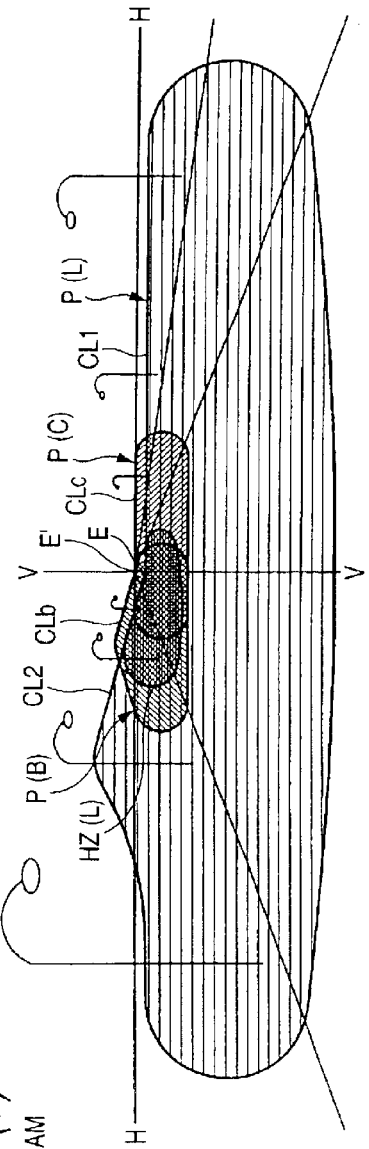
FIG. 8 (a) LOW BEAM
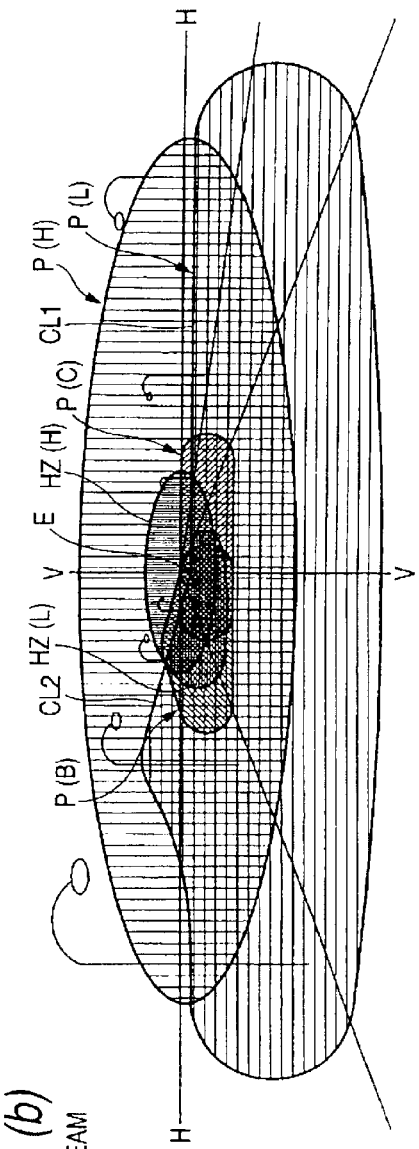
FIG. 8 (b) HIGH BEAM

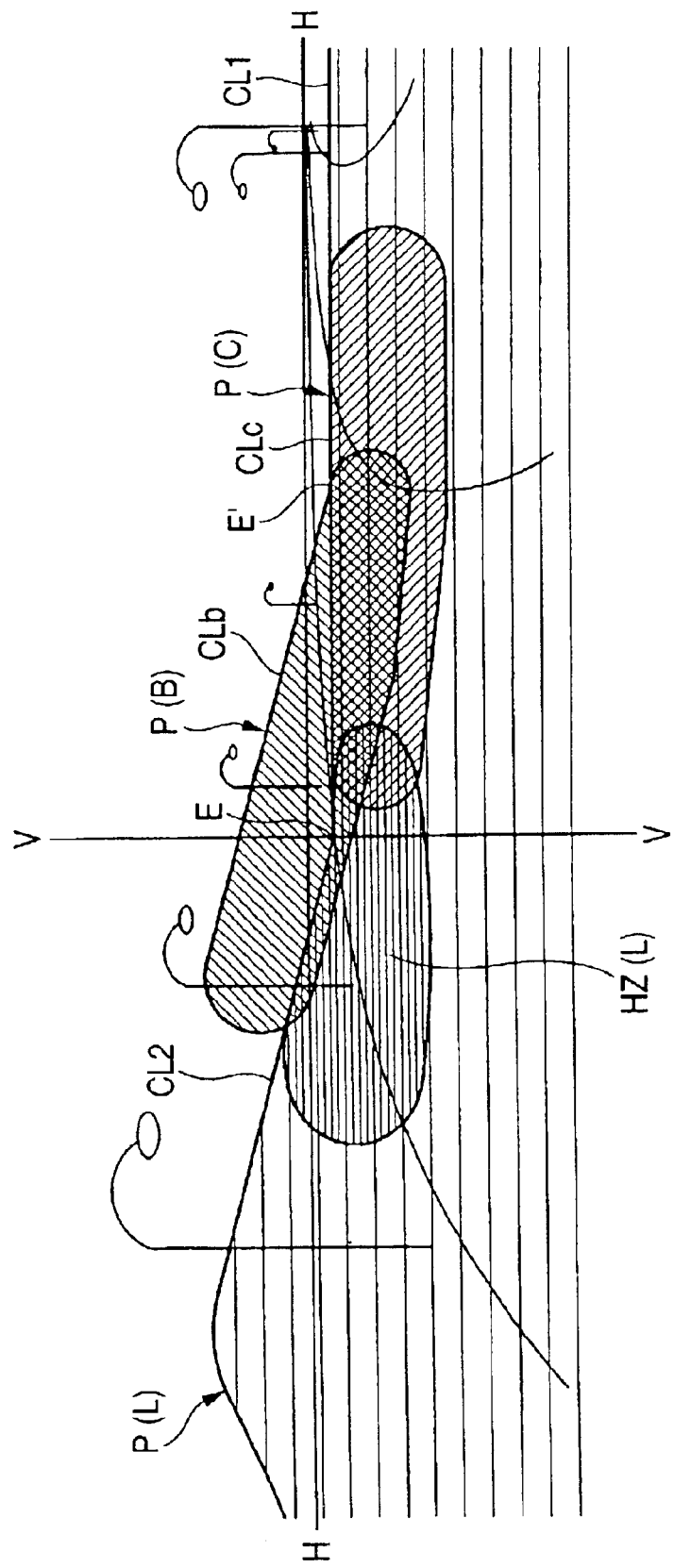

HEADLAMP FOR VEHICLE

BACKGROUND OF THE INVENTION

1. Field of the Invention

The present invention relates to a headlamp for a vehicle comprising a lighting unit for low beam irradiation.

2. Description of the Related Art

In general, a headlamp for a vehicle is constituted by a lighting unit comprising a light source and a reflector for forward reflecting light from the light source in order to carry out forward beam irradiation in a predetermined light distribution pattern.

In that case, the lighting unit for low beam irradiation is constituted such that the beam irradiation is carried out in a low beam distribution pattern having a predetermined cutoff line on an upper edge, thereby maintaining the forward visibility of a driver of a self-car while giving no glare to a driver in a car running in the opposite direction.

In the following vehicle running situation, however, there rises a problem such that a sufficient forward visibility cannot be obtained by the beam irradiation from the lighting tool unit for low beam irradiation.

More specifically, during high speed running, the driver of the self-car watches a distant road carefully for driving. In the beam irradiation in an ordinary low beam distribution pattern, however, light is not irradiated on a part provided above the height of a cutoff line thereof. Therefore, there is a problem in that the visibility of the distant road cannot be sufficiently maintained during high speed running at night.

SUMMARY OF THE INVENTION

The invention has been made in consideration of the circumstances and has an object to provide a headlamp for a vehicle comprising a lighting tool unit for low beam irradiation which can sufficiently maintain the visibility of a distant road during high speed running in a low beam irradiation state.

The invention attains the object by such a structure that a predetermined auxiliary light distribution pattern is additionally formed by using a movable shade.

More specifically, the invention provides a headlamp for a vehicle constituted to carry out beam irradiation in a low beam distribution pattern having a predetermined cutoff line on an upper edge by a lighting tool unit comprising a light source and a reflector for forward reflecting light emitted from the light source, wherein there are provided a movable shade constituted to take a shielding position in which a part of light incident on the reflector from the light source is shielded and a shielding release position in which the shielding is released, and a shade driving device for moving the movable shade between the snieluing position and the shielding release position, the shade driving device moves the movable shade to the shielding position at a predetermined set vehicle speed or less, and moves the movable shade to the shielding release position when the set vehicle speed is exceeded, and beam irradiation is carried out in the low beam distribution pattern when the movable shade is set in the shielding position, and an auxiliary light distribution pattern having a cutoff line above the cutoff line of the low beam distribution pattern is added to the low beam distribution pattern to carry out the beam irradiation when the movable shade is set in the shielding release position.

The specific structure of the "lighting unit" is not particularly restricted if it comprises a light source and a reflector for forward reflecting light emitted from the light source, and may be constituted to carry out main light distribution control by the reflector or may be constituted such that a lens is provided in front of the reflector to carry out main light distribution control by means of the lens.

Moreover, the specific structure of the "light source" is not particularly restricted, and may be the discharge light emitting section of a discharge bulb or the filament of an incandescent bulb such as a halogen bulb.

The specific structures of the "movable shade", for example, a shape and a size are not particularly restricted if it is constituted to take a shielding position and a shielding release position.

If the "shielding release position" is set to be a position in which the shielding amount of light incident on the reflector from the light source can be smaller than that in the shielding position of the movable shade, a specific position thereof is not particularly restricted and it is not necessary to always set a position in which the shielding of the light incident on the reflector from the light source can be released completely.

The specific structure of the "shade driving device" is not particularly restricted if it is constituted to move the movable shade between the shielding position and the shielding release position, and a solenoid or a pulse motor can be utilized, for example. Moreover, the manner of the "movement" of the movable shade by the shade driving device is not particularly restricted but a rotation or a straight reciprocation can be employed, for example.

If the "low beam distribution pattern" has a predetermined cutoff line on an upper edge, the shape of the cutoff line is not particularly restricted. Moreover, if the "auxiliary light distribution pattern" has a cutoff line on the upper side of the cutoff line of the low beam distribution pattern, the shape of the cutoff line is not particularly restricted. Referring to the degree at which the position of the cutoff line of the "auxiliary light distribution pattern" is set to the upper side of the cutoff line of the low beam distribution pattern, a specific value thereof is not particularly restricted.

The specific position of the "predetermined set vehicle speed" is not particularly restricted and can be set to have a proper value (for example, 70 km/hr) in the range of 60 to 80 km/hr, for example.

BRIEF DESCRIPTION OF THE DRAWINGS

FIGS. 7(a) and 7(b) show a perspective view showing a light distribution pattern formed on a virtual vertical screen provided in a position of 25 m in the forward part of a lighting tool by beam irradiation from the headlamp for a vehicle during low and medium speed running, and FIGS. 8(a) and 8(b) show a perspective view showing a light distribution pattern formed on the virtual vertical screen provided in the position of 25 m in the forward part of the lighting tool by the beam irradiation from the headlamp for a vehicle during high speed running.

FIG. 9 is a perspective view showing the main part of a light distribution pattern formed on the virtual vertical screen when a vehicle turns toward the opposite lane side (the right side) in the low beam irradiation state.

DESCRIPTION OF THE PREFERRED EMBODIMENTS

An embodiment of the invention will be described below with reference to the drawings.

Figure 1:
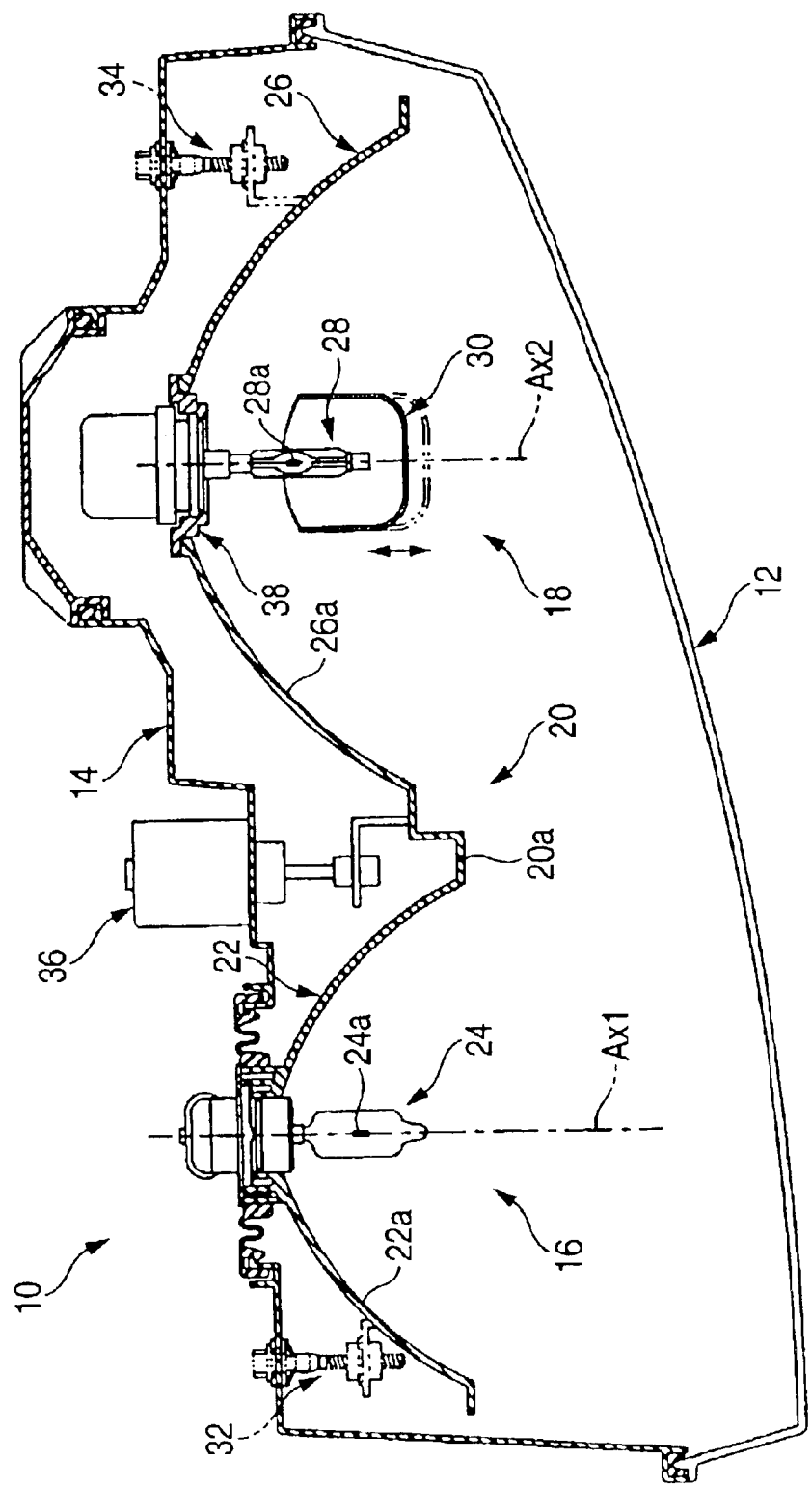
FIG. 1 is a sectional plan view showing a headlamp for a vehicle according to an embodiment of the invention.

FIG. 1 is a sectional plan view showing a headlamp for a vehicle according to the embodiment of the invention.

As shown, a headlamp 10 for a vehicle according to the embodiment is a lighting tool positioned on the left side in a pair of left and right four-lamp type headlamps provided on the front end of a vehicle. A lighting tool positioned on the right side also has the same structure.

In the headlamp 10 for a vehicle, a lighting unit 16 for a high beam and a lighting unit 18 for a low beam which are disposed adjacently to each other in a transverse direction are tiltably provided as one tilt unit 20 in vertical and transverse directions in a lamp housing formed by a plain translucent cover 12 and a lamp body 14. The headlamp 10 for a vehicle carries out low beam irradiation by turning on the lighting unit 18 for a low beam and carries out high beam irradiation by simultaneously turning on both of the lighting units 16 and 18.

The lighting unit 16 for a high beam includes a parabola type reflector 22 having an optical axis Ax1 extended in the longitudinal direction of the vehicle and a halogen bulb 24 having a single filament 24a. The halogen bulb 24 is supported on the reflector 22 such that the filament 24a is positioned on the optical axis Ax1. The reflector 22 has a reflecting surface 22a provided with a plurality of reflecting elements (not shown) on a rotating paraboloid setting the optical axis Ax1 as a central axis, and serves to forward diffuse, deflect and reflect light emitted from the filament 24a.

On the other hand, the lighting unit 18 for a low beam includes a parabola type reflector 26 having an optical axis Ax2 extended in the longitudinal direction of the vehicle, a discharge bulb 28 having a discharge light emitting section 28a (light source) and a movable shade 30 (which will be described below). The discharge bulb 28 is supported on the reflector 26 through a bulb support member 38 such that the discharge light emitting section 28a is positioned on the optical axis Ax2. The reflector 26 has a reflecting surface 26a provided with a plurality of reflecting elements (not shown) on a rotating paraboloid setting the optical axis Ax2 as a central axis, and serves to forward diffuse, deflect and reflect light emitted from the discharge light emitting section 28a.

The reflector 22 of the lighting unit 16 for a high beam and the reflector 26 of the lighting unit 18 for a low beam are integrally formed through a tilt unit panel 20a, thereby constituting the tilt unit 20. The tilt unit 20 is supported on the lamp body 14 through aiming mechanisms 32 and 34 on left and night upper ends thereof and is supported on the lamp body 14 through a leveling device 36 on a central lower end thereof.

The tilt unit 20 is tilted in a vertical direction by the driving operation of the leveling device 36. More specifically, in the case in which the attitude of a car body is changed by pitching during vehicle running, the tilt unit 20 is tilted in the vertical direction by the driving operation of the leveling device 36 to always hold the irradiating direction of a beam to be irradiated from both of the lighting units 16 and 18 to be a constant direction.

Figure 2:
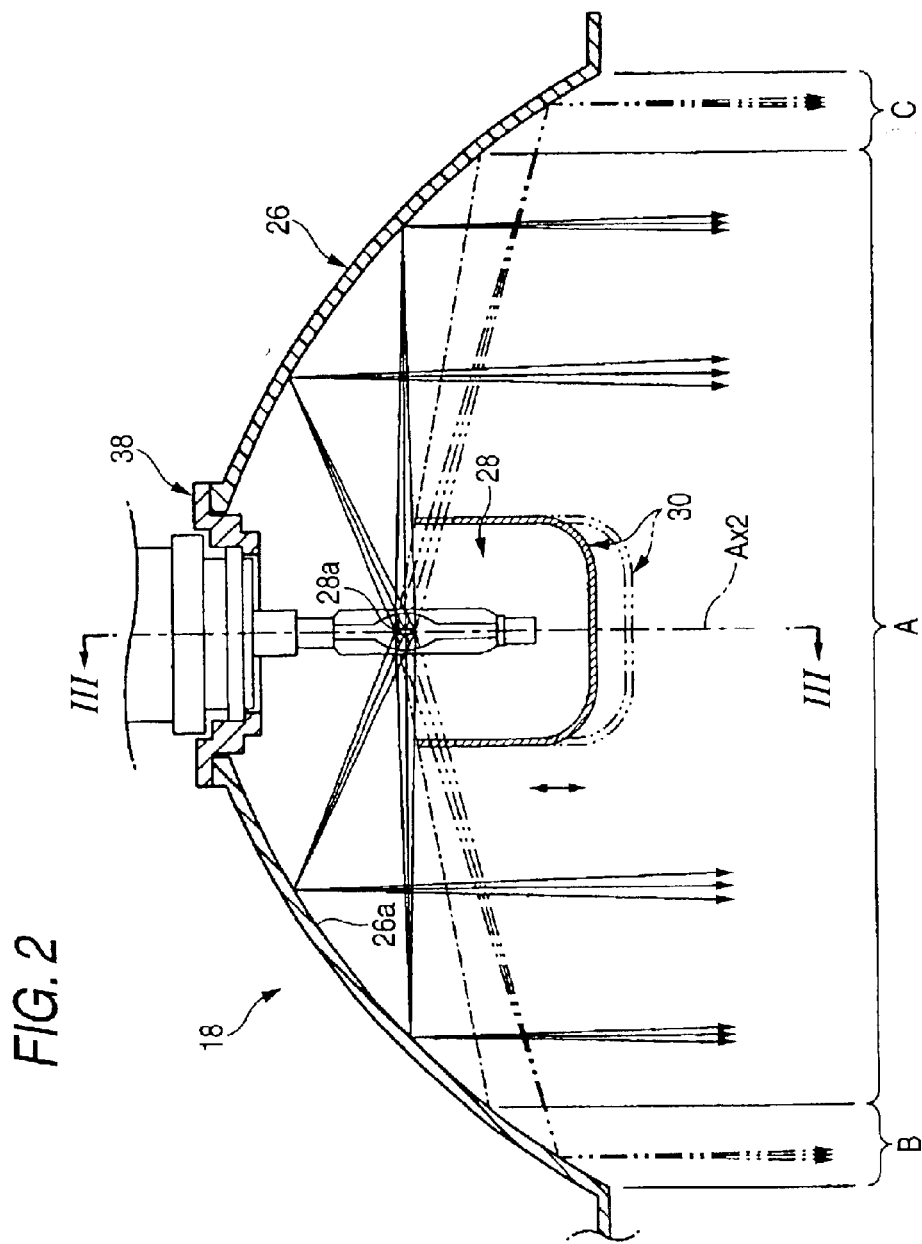
FIG. 2 is a view showing the details of a main part in FIG. 1, illustrating, in detail, a lighting unit for a low beam in the headlamp for a vehicle.
Figure 3:
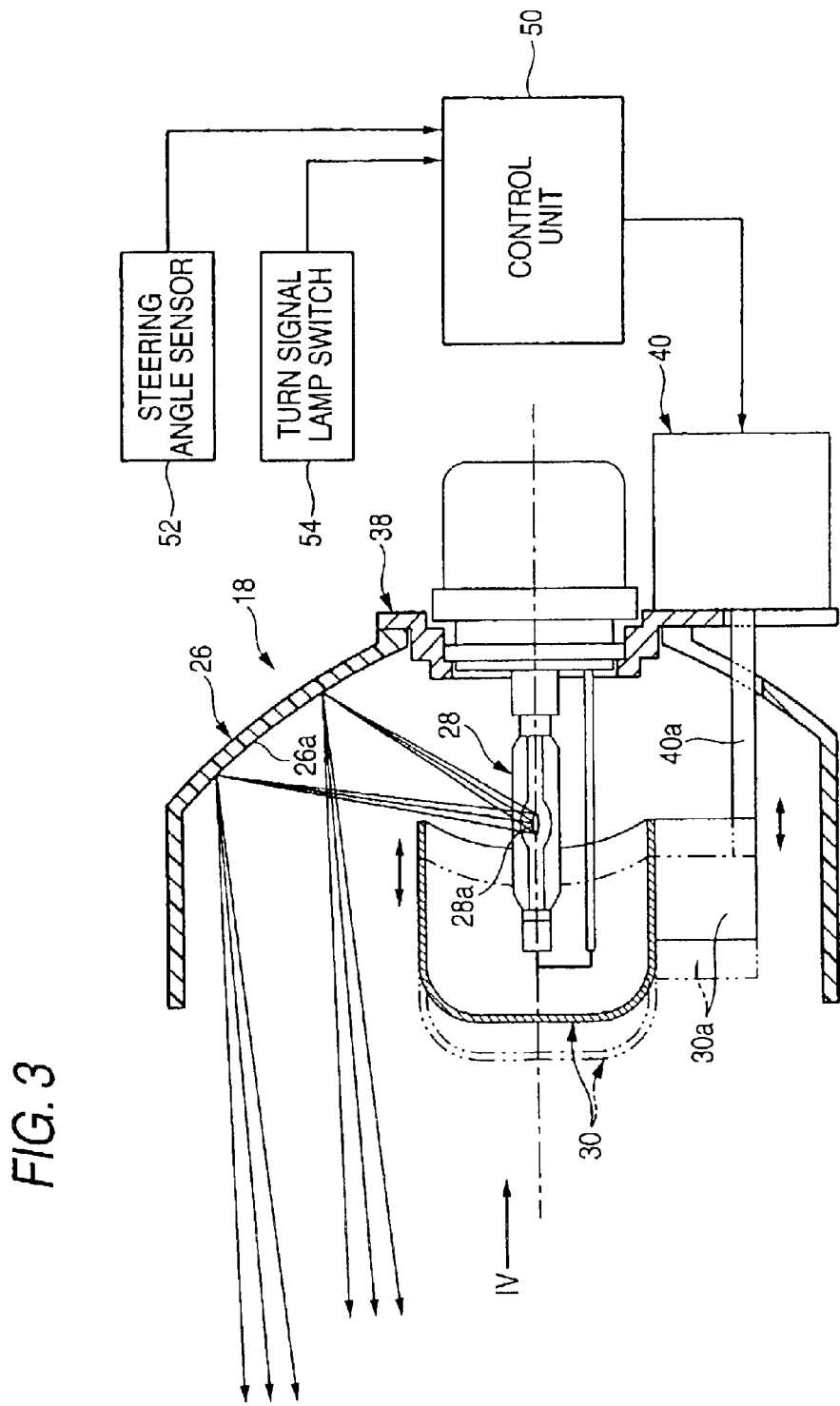
FIG. 3 is a sectional view taken along a line III—III in FIG. 2.
Figure 4:
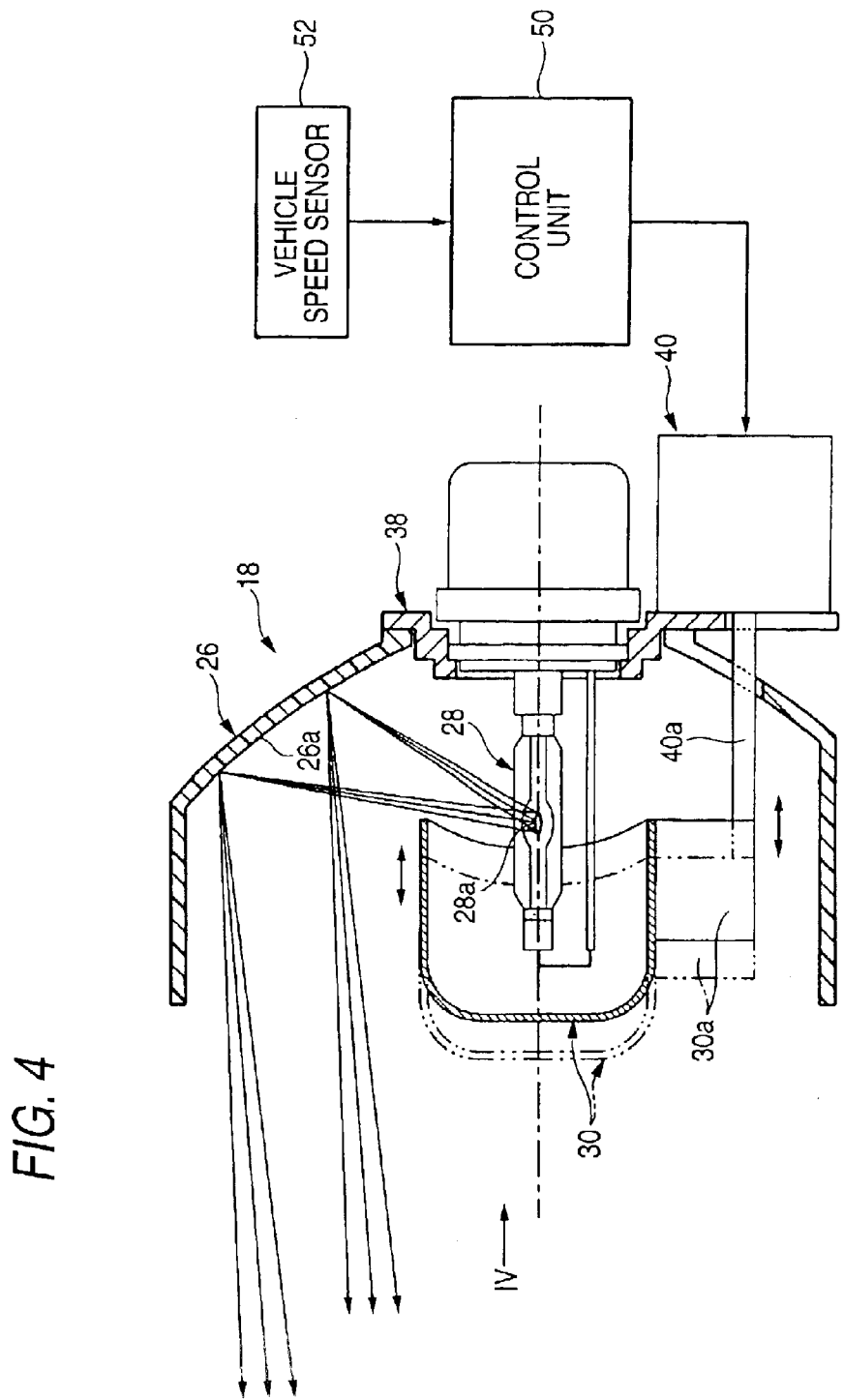
FIG. 4 is another sectional view taken along a line III—III in FIG. 2.

FIG. 2 is a view showing the details of a main part in FIG. 1, illustrating, in detail, the lighting unit 18 for a low beam, FIG. 3 is a sectional view taken along a line III—III in FIG. 2, and FIG. 4 is a view seen in a direction of IV in FIG. 3.

As shown in these drawings, the movable shade 30 is provided reciprocably in a longitudinal direction in order to cover the discharge bulb 28 like a cup from the forward side, and can take a shielding position shown in a solid line of the drawings and a shielding release position shown in a two-dotted chain line of the drawings. The movable shade 30 shields light incident on left and right peripheral edge portions B and C of the reflecting surface 26a of the reflector 26 from the discharge light emitting section 28a and permits only light incidence on a central part A of the reflecting surface 26a when the movable shade 30 is set in the shielding position, while the movable shade 30 releases the shielding and also permits the light incidence on the left and right peripheral edge portions B and C of the reflecting surface 26a from the discharge light emitting section 28a when the movable shade 30 is set in the shielding release position.

The movement of the movable shade 30 is carried out by the driving operation of the shade driving device 40. The shade driving device 40 is formed by a solenoid of a built-in return spring type, and is fixed to the bulb support member 38 below the discharge bulb 28 such that a plunger 40a is protruded forward. The lower end of a stay 30a extended downward from the lower end of the movable shade 30 is fixed to the tip portion of the plunger 40a of the shade driving device 40.

As shown in FIG. 3, the driving operation of the shade driving device 40 is controlled by a control unit 50.

More specifically, a detection signal is input from a steering angle sensor 52 and a turn signal lamp switch 54 to the control unit 50, and the control unit 50 detects that a steering operation has been carried out in response to the signal input from the steering angle sensor 52, and furthermore, detects that a winker operation has been carried out (the turn signal lamp has been operated) in response to the signal input from the turn signal lamp switch 54.

When the steering operation or winker operation for turning the vehicle toward the opposite lane side is carried out, the control unit 50 outputs a driving signal to the shade driving device 40. When the driving signal is input, the shade driving device 40 excites the solenoid to advance the plunger 40a to a position shown in a two-dotted chain line and the movable shade 30 is moved to the shielding release position. On the other hand, when the driving signal is not input, the shade driving device 40 releases the excitation of the solenoid to retreat the plunger 40a to a position shown in a solid line by the elastic force of the return spring, thereby moving the movable shade 30 to the shielding position.

Further, the driving operation of the shade driving device 40 is controlled by a control unit 50 in other way such as shown in FIG. 4.

In this figure, a detection signal is input from a vehicle speed sensor 52 to the control unit 50. The control unit 50 outputs a driving signal to the shade driving device 40 when a vehicle speed exceeds a predetermined set vehicle speed (for example, 70 km/hr) to bring a high speed running state. When the driving signal is input, the shade driving device 40 excites the solenoid to advance the plunger 40a to a position shown in a two-dotted chain line and to move the movable shade 30 to the shielding release position. On the other hand, when the driving signal is not input (that is, the vehicle speed is decreased to the set vehicle speed or less and a low and medium speed running state is thereby brought), the shade driving device 40 releases the excitation of the solenoid to retreat the plunger 40a to a position shown in a solid line by the elastic force of the return spring, thereby moving the movable shade 30 to the shielding position.

FIGS. 7(*a*) and 7(*b*), and FIGS. 8(*a*) and 8(*b*) are perspective views showing a light distribution pattern formed on a virtual vertical screen provided in a position of 25 m in the forward part of a lighting tool by beam irradiation from the headlamp 10 for a vehicle according to the embodiment, FIGS. 7(*a*) and 7(*b*) showing a state obtained during low and medium speed running and FIGS. 8(*a*) and 8(*b*) showing a state obtained during high speed running.

As shown in FIGS. 7(*a*) and 7(*b*), in the low and medium speed running state, the headlamp 10 for a vehicle forms a light distribution pattern P(L) for a low beam in left light distribution shown in FIG. 7(*a*) by beam irradiation from the lighting unit 18 for a low beam during low beam irradiation, while it forms a light distribution pattern obtained by superposing a light distribution pattern P(H) for a high beam on the light distribution pattern P(L) for a low beam as shown in FIG. 7(*b*) by beam irradiation from both of the lighting units 16 and 18 during high beam irradiation.

Also during the low beam irradiation, a light distribution pattern obtained by adding auxiliary light distribution patterns P(B) and P(C) shown in a two-dotted chain line of FIG. 6(*a*) to a light distribution pattern P(L) for a low beam is formed when the vehicle is to turn toward the opposite lane side (the right side).

The low beam distribution pattern P(L) is formed by light reflected from the central part A of the reflecting surface 26a of the reflector 26 in a state in which the movable shade 30 is set in the shielding position, and includes a cutoff line having a horizontal cutoff line CL1 and an oblique cutoff line CL2 on an upper edge thereof.

The horizontal cutoff line CL1 is formed on the opposite lane side in a front direction of the lighting tool (H-V), while the oblique cutoff line CL2 is formed to rise obliquely (for example, to rise at 15 degrees) from the horizontal cutoff line CL1 toward the self-lane side. An intersecting point (an elbow point) E of the horizontal cutoff line CL1 and the oblique cutoff line CL2 is set into a lower position by 0.5 to 0.6 degree in the H-V. In the low beam distribution pattern P(L), a hot zone (a high luminous intensity region) HZ(L) is formed in the lower left vicinal region of the elbow point E.

A hot zone in the light distribution pattern during the high beam irradiation is obtained by superposing a hot zone HZ(H) of the light distribution pattern P(H) for a high beam formed around the H-V on the hot zone HZ(L) of the light distribution pattern P(L) for a low beam.

As shown in FIGS. 8(*a*) and 8(*b*), in a high speed running state, auxiliary light distribution patterns P(B) and P(C) are added to the periphery of the hot zone HZ(L) of the light distribution pattern P(L) for a low beam. These auxiliary light distribution patterns P(B) and P(C) are additionally formed by light reflected from the left and right peripheral edge portions B and C of the reflecting surface 26a of the reflector 26 in a state in which the movable shade 30 is set in the shielding release position.

The auxiliary light distribution pattern P(B) formed by the light reflected from the peripheral edge portion B on the right side (the left side in FIG. 4) in the reflecting surface 26a is a comparatively small light distribution pattern having a high luminous intensity which is formed to expand the hot zone HZ(L) toward the self-lane side, and an upper edge thereof is formed as an oblique cutoff line CLb extended in almost parallel with the oblique cutoff line CL2 in the vicinity of the upper part of the oblique cutoff line CL2.

Figure 5:
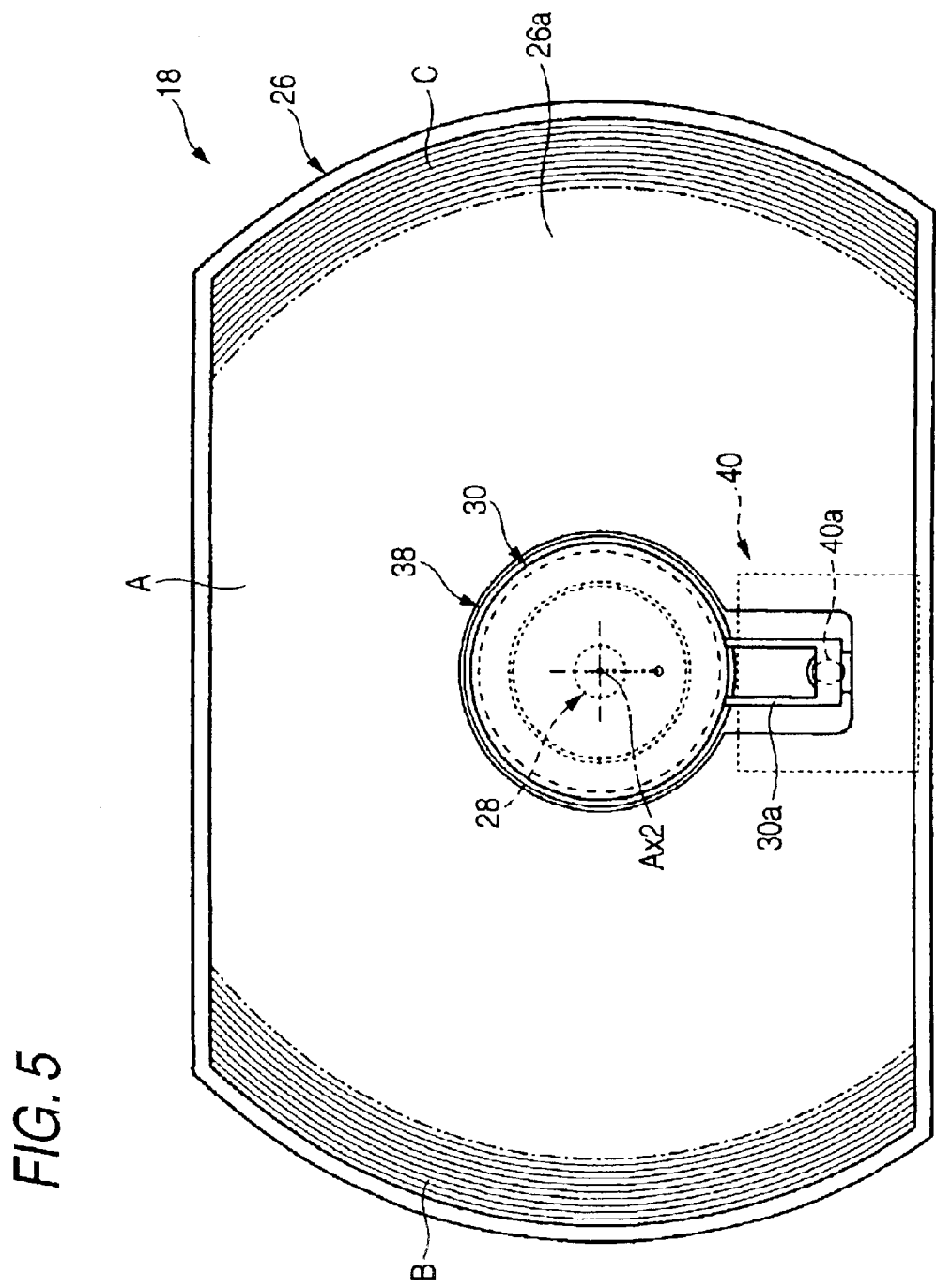
FIG. 5 is a view seen in a direction of IV in FIG. 3, FIGS. 6(a) and 6(b) show the perspective views showing a light distribution pattern formed on a virtual vertical screen provided in a position of 25 m in the forward part of a lighting tool by beam irradiation from the headlamp for a vehicle.

On the other hand, the auxiliary light distribution pattern P(C) formed by the light reflected from the peripheral edge portion C on the left side (the right side in FIG. 5) in the reflecting surface 26a is a comparatively small light distribution pattern having a high luminous intensity which is formed to expand the hot zone HZ(L) toward the opposite lane side, and an upper edge thereof is formed as a horizontal cutoff line CLc extended in almost parallel with the horizontal cutoff line CL1 in the vicinity of the upper part of the horizontal cutoff line CL1.

By the synthesis of these two auxiliary light distribution patterns P(B) and P(C), a new elbow point E' is formed by the horizontal cutoff line CLc and the oblique cutoff line CLb. The position of the elbow point E' is set to be the position of the H-V.

In the embodiment, the auxiliary light distribution patterns P(B) and P(C) are added in the high speed running state also during the high beam irradiation. Consequently, the hot zone in the light distribution pattern at time of the high beam irradiation is obtained by superposing the hot zone HZ(L) of the light distribution pattern P(L) for a low beam, the hot zone HZ(H) of the light distribution pattern P(H) for a high beam and the auxiliary light distribution patterns P(B) and P(C) in order to form a hot zone which is as bright and large as possible.

FIG. 9 is a perspective view showing the main part of a light distribution pattern formed on a virtual vertical screen provided in a position of 25 m in the forward part of the lighting tool when the vehicle turns toward the opposite lane side (the right side) in the low beam irradiation state.

In this state, the auxiliary light distribution patterns P(B) and P(C) are added to the low beam distribution pattern P(L). The auxiliary light distribution patterns P(B) and P(C) are additionally formed by light reflected from the left and right peripheral edge portions B and C of the reflecting surface 26a of the reflector 26 in a state in which the movable shade 30 is set in the shielding release position.

The auxiliary light distribution pattern P(B) formed by the light reflected from the peripheral edge portion B on the right side in the reflecting surface 26a (the left side in FIG. 4) is formed along the oblique cutoff line CL2 on the upper side from the horizontal cutoff line CL1 and the oblique cutoff line CL2. The upper edge of the auxiliary light distribution pattern P(B) is formed as an oblique cutoff line CLb extended in almost parallel with the oblique cutoff line CL2 in a position on the opposite lane side at a predetermined angle (for example, 5 degrees) with respect to the oblique cutoff line CL2.

On the other hand, the auxiliary light distribution pattern P(C) formed by the light reflected from the peripheral edge portion C on the left side in the reflecting surface 26a (the right side in FIG. 4) is formed along the horizontal cutoff line CL1 in the vicinity of the lower part of the horizontal cutoff line CL1. The upper edge of the auxiliary light distribution pattern P(C) is formed as a horizontal cutoff line CLc extended in a horizontal direction on almost the level with the horizontal cutoff line CL1, and the horizontal cutoff line CLc and the oblique cutoff line CLb form a new elbow point E'.

The auxiliary light distribution patterns P(B) and P(C) are formed with a comparatively small size. Consequently, a luminous intensity in the vicinity of the elbow point E' can be increased sufficiently.

As described above in detail, the headlamp 10 for a vehicle according to the embodiment comprises the lighting unit 18 for a low beam including the movable shade 30 constituted to take the shielding position in which a part of the light incident on the reflector 26 from the discharge light emitting section 28a is shielded and the shielding release position in which the shielding is released, and the shade driving device 40 for moving the moving shade 30 to the shielding position at a set vehicle speed or less and for moving the movable shade 30 to the shielding release position when the set vehicle speed is exceeded. When the movable shade 30 is set in the shielding position, the beam irradiation is carried out in the low beam distribution pattern P(L) including the cutoff line having the horizontal cutoff line CL1 and the oblique cutoff line CL2 on the upper edge. On the other hand, when the movable shade 30 is set in the shielding release position, the auxiliary light distribution patterns P(B) and P(C) having the cutoff lines CLb and CLc above the cutoff lines CL1 and CL2 of the low beam distribution pattern P(L) are added to the low beam distribution pattern P(L) to carry out the beam irradiation. Therefore, the following functions and effects can be obtained.

More specifically, when the vehicle turns toward the opposite lane side, a forward visibility in a turning direction is obtained with difficulty by the beam irradiation in the low beam distribution pattern P(L). If the movable shade 30 is moved to the shielding release position by the shade driving device 40 to add the auxiliary light distribution pattern P(B) to the low beam distribution pattern P(L) as in the embodiment, the forward visibility in the turning direction can be enhanced, In that case, the auxiliary light distribution pattern P(B) has the oblique cutoff line CLb. Also in the case in which the auxiliary light distribution pattern P(B) is added to the low beam distribution pattern P(L), therefore, the whole light distribution pattern has the horizontal cutoff line CL1 and the oblique cutoff line CLb. Accordingly, glare can be prevented from being given to a driver in a car running in the opposite direction, and furthermore, the forward visibility of the driver of a self-car can be enhanced.

In addition, in the embodiment, the beam irradiation in a light distribution pattern in conformity with the vehicle running situation is carried out by using the movable shade 30. By an inexpensive and compact structure, therefore, the auxiliary light distribution pattern can be formed with high precision.

In the embodiment, particularly, the cutoff line CLb of the auxiliary light distribution pattern P(B) is formed to be extended in almost parallel with the oblique cutoff line CL2 on the opposite lane side from the oblique cutoff line CL2 of the low beam distribution pattern P(L). When the vehicle is to turn toward the opposite lane side, therefore, the auxiliary light distribution pattern P(B) is additionally formed so that glare can be prevented from being given to a driver in a car running in the opposite direction, and furthermore, a forward visibility in a turning direction can be complemented effectively.

In addition, in the embodiment, the auxiliary light distribution pattern P(C) having the horizontal cutoff line CLc extended in a horizontal direction on almost the level with the horizontal cutoff line CL1 is additionally formed on the upper edge together with the auxiliary light distribution pattern P(B). When the vehicle is to turn toward the opposite lane side, therefore, glare can be prevented from being given to a driver in a car running in the opposite direction, and furthermore, a forward visibility in a turning direction can be enhanced still more.

In the embodiment, furthermore, when the steering operation or winker operation for turning the vehicle toward the opposite lane side is carried out, the auxiliary light distribution patterns P(B) and P(C) are added to the low beam distribution pattern P(L). Therefore, the auxiliary light distribution patterns P(B) and P(C) can be added when the vehicle has not turned toward the opposite lane side and will apparently turn toward the opposite lane side in the near future as well as when the vehicle is actually turning toward the opposite lane side. Consequently, it is possible to carry out the beam irradiation in a light distribution pattern corresponding to the careful watching point of a driver in an actual vehicle running situation.

In the embodiment, the high beam distribution pattern P(H) is superposed on the low beam distribution pattern P(L) during the high beam irradiation. Therefore, a forward visibility can be maintained sufficiently. Also in the high beam irradiation state, the auxiliary light distribution patterns P(B) and P(C) may be additionally formed when the vehicle turns toward the opposite lane side. Consequently, the forward visibility in the turning direction can be enhanced still more. In the high beam irradiation state, moreover, the auxiliary light distribution patterns P(B) and P(C) may be additionally formed. Thus, the forward visibility can be enhanced still more.

In the embodiment, when the vehicle is to turn toward the opposite lane side, the auxiliary light distribution patterns P(B) and P(C) are added to the low beam distribution pattern P(L) to carry out the beam irradiation. Also in other vehicle running situations, the auxiliary light distribution patterns P(B) and P(C) can be formed additionally. For example, when the vehicle comes from a downward slope to an upward slope, only a road at a short distance in the forward part of the vehicle is irradiated in the low beam distribution pattern P(L). At this time, if the auxiliary light distribution patterns P(B) and P(C) are added to the low beam distribution pattern P(L) to carry out the beam irradiation, the forward road of the vehicle can be irradiated sufficiently to enhance the forward visibility.

In the case in which the reflector 22 of the lighting unit 16 for a high beam and the reflector 26 of the lighting unit 18 for a low beam are integrally formed through the tilt unit panel 20a as in the headlamp 10 for a vehicle according to the embodiment, the beam irradiation is carried out in the light distribution pattern in conformity with the vehicle running situation. Therefore, it is impossible to change the direction of the lighting unit 18 for a low beam and it is not easy to employ a structure in which the direction of the reflector 26 is partially changed. In that respect, the movable shade 30 is utilized in the embodiment. Therefore, it is possible to easily carry out the beam irradiation in the light distribution pattern in conformity with the vehicle running situation.

More specifically, the auxiliary light distribution patterns P(B) and P(C) are added to the low beam distribution pattern P(L) during high speed running in which the careful watching point of a self-car driver is positioned on a distant road. Consequently, it is possible to sufficiently carry out beam irradiation for the distant road. Thus, a visibility for the distant road can be enhanced.

In addition, the auxiliary light distribution patterns P(B) and P(C) have the cutoff lines CLb and CLc. Also in the case in which the auxiliary light distribution patterns P(B) and P(C) are added to the low beam distribution pattern P(L), therefore, the whole light distribution pattern has the cutoff lines CLb and CLc. The cutoff lines CLb and CLc are positioned on the upper side of the cutoff lines CL1 and CL2 of an ordinary low beam distribution pattern P(L). However, a distance from a forward running car is generally increased during high speed running. Therefore, great glare can be prevented from being given to a driver in the forward running car. Moreover, the vehicle does not carry out great pitching during the high speed running. Also in the case in which the positions of the cutoff lines CLb and CLc of the auxiliary light distribution patterns P(B) and P(C) are set to the slightly upper side of the cutoff lines CL1 and CL2 of an ordinary low beam distribution pattern P(L), therefore, great glare is not given to a driver in a car running in the opposite direction.

According to the embodiment, thus, the visibility of the distant road can be sufficiently maintained during the high speed running in a low beam irradiation state. Consequently, it is possible to enhance a running safety.

As a matter of course, a state in which the vehicle is actually turning toward the opposite lane side corresponds to "when turning toward the opposite lane side", an "when turning toward the opposite lane side" may include a state in which the vehicle has not turned toward the opposite lane side yet but will apparently turn toward the opposite lane side in the near future (for example, in which a turn signal lamp is operated).

In the embodiment, furthermore, the movable shade 30 is moved to add the auxiliary light distribution patterns P(B) and P(C). By an inexpensive and compact structure, therefore, it is possible to form the auxiliary light distribution patterns P(B) and P(C) with high precision.

In the embodiment, particularly, the shapes of the cutoff lines CLb and CLc of the auxiliary light distribution patterns P(B) and P(C) are set to be almost the same as those of the cutoff lines CL1 and CL2 of the low beam distribution pattern P(L). Therefore, the addition and addition release of the auxiliary light distribution patterns P(B) and P(C) can be carried out without giving an uncomfortable feeling to the driver of a self-car.

In the embodiment, moreover, in the case in which the attitude of the car body is changed by pitching during vehicle running, the tilt unit 20 is tilted in a vertical direction by the driving operation of the leveling device 36 to always hold the irradiating directions of the beams to be irradiated from both of the lighting units 16 and 18 to be constant directions. Therefore, the angular positions in the vertical directions of the cutoff lines CL1 and CL2 of the low beam distribution pattern P(L) and the cutoff lines CLb and CLc of the auxiliary light distribution patterns P(B) and P(C) can be always maintained to be almost constant.

Accordingly, it is not necessary to consider the generation of glare by the vertical motion of the light distribution pattern with the pitching of the car body. Correspondingly, the positions of the cutoff lines CLb and CLc of the auxiliary light distribution patterns P(B) and P(C) can be set to be high. In the embodiment, the positions are set onto the H—H line to be critical positions in which the direction of the horizontal cutoff line CLc of the auxiliary light distribution pattern P(B) is not turned upward. By such setting, the visibility of a distant road can be enhanced still more.

In the case in which the reflector 22 of the lighting unit 16 for a high beam and the reflector 26 of the lighting unit 18 for a low beam are integrally formed through the tilt unit panel 20a as in the headlamp 10 for a vehicle according to the embodiment, it is impossible to change only the direction of the lighting unit 18 for a low beam into an upward direction in order to enhance the visibility of a distant road and it is not easy to have such a structure that the direction of the reflector 26 is partially changed. In this respect, in the embodiment, the movable shade 30 is utilized. Therefore, it is possible to easily carry out the beam irradiation for enhancing the visibility of the distant road.

In the embodiment, moreover, the auxiliary light distribution patterns P(B) and P(C) are added in the high speed running state also during the high beam irradiation. Therefore, the hot zone in the light distribution pattern at the high beam irradiation can be bright and large. By the superposition of the hot zone HZ(L) of the low beam distribution pattern P(L) and the hot zone HZ(H) of the high beam distribution pattern P(H), a brightness can be maintained to some extent at the time of the high beam irradiation. At time of the high beam irradiation, therefore, it is not necessary to always add the auxiliary light distribution patterns P(B) and P(C) also in the high speed running state.

What is claimed is:

1. A headlamp for a vehicle carrying out beam irradiation in a low beam distribution pattern having a predetermined cutoff line on an upper edge by a lighting unit comprising a light source and a reflector for forward reflecting light emitted from the light source, a movable shade such as to take a shielding position in which a part of light incident on the reflector from the light source is shielded, and a shielding release position in which the shielding is released, and a shade driving device for moving the movable shade between the shielding position and the shielding release position, wherein:

said beam irradiation is carried out in the low beam distribution pattern when the movable shade is set in the shielding position, and wherein an auxiliary light distribution pattern, which is formed by light reflected by the reflector and which has a cutoff line above a cutoff line of the low beam distribution pattern, is added to the low beam distribution pattern to carry out the beam irradiation when the movable shade is set in the shielding release position, the cutoff line of the low beam distribution pattern includes a horizontal cutoff line on an opposite lane side and an oblique cutoff line rising obliquely from the horizontal cutoff line toward a self-lane side, and a cutoff line of the auxiliary light distribution pattern is extended substantially in parallel with the oblique cutoff line of the low beam distribution pattern on the opposite lane side therefrom.

2. The headlamp for a vehicle according to claim 1, wherein the shade driving device moves the movable shade to the shielding release position when the vehicle turns toward an opposite lane side.

3. The headlamp for a vehicle according to claim 1, wherein the shade driving device moves the movable shade to the shielding release position based on a detection signal from a steering angle sensor.

4. The headlamp for a vehicle according to claim 1, wherein the shade driving device moves the movable shade to the shielding release position based on a detection signal from a turn signal lamp switch.

5. The headlamp for a vehicle according to claim 1, wherein the shade driving device moves the movable shade to the shielding position when a vehicle speed is no more than a predetermined speed, while the shade driving device moves the movable shade to the shielding release position when the vehicle speed is more than the predetermined speed.

6. The headlamp for a vehicle according to claim 1, wherein a shape of the cutoff line of the auxiliary light distribution pattern is set to be almost the same as that of the cutoff line of the low beam distribution pattern.

7. The headlamp for a vehicle according to claim 1, further comprising a leveling device for varying an irradiating direction of a beam to be irradiated from the lighting unit in a vertical direction corresponding to a change in an attitude of a vehicle body.

* * * * *